United States Patent
Schilling et al.

[11] Patent Number: 6,108,327
[45] Date of Patent: Aug. 22, 2000

[54] ORTHOGONAL SPREAD SPECTRUM SYSTEM

[75] Inventors: Donald L. Schilling, Sands Point, N.Y.; Joseph Garodnick, Centerville, Mass.

[73] Assignee: Golden Bridge Technology, Inc., West Long Branch, N.J.

[21] Appl. No.: 09/016,970

[22] Filed: Feb. 2, 1998

[51] Int. Cl.$^7$ .............................. H04B 7/216; H04J 3/06
[52] U.S. Cl. ........................ 370/342; 370/335; 370/515
[58] Field of Search ..................................... 370/320, 335, 370/342, 441, 479, 208, 209, 503, 511, 514, 515, 516; 375/200, 205, 206

[56] References Cited

U.S. PATENT DOCUMENTS

| | | | |
|---|---|---|---|
| 4,894,842 | 1/1990 | Broekhoven et al. ...................... | 375/1 |
| 5,063,560 | 11/1991 | Yerbury et al. ............................ | 370/18 |
| 5,081,643 | 1/1992 | Schilling .................................... | 375/1 |
| 5,109,390 | 4/1992 | Gilhousen et al. ......................... | 375/1 |
| 5,166,951 | 11/1992 | Schilling .................................... | 375/1 |
| 5,247,702 | 9/1993 | Su et al. ................................. | 455/34.1 |
| 5,267,244 | 11/1993 | Messerschmitt et al. ............. | 370/95.3 |
| 5,870,393 | 2/1999 | Yano et al. .............................. | 370/335 |
| 5,943,331 | 8/1999 | Lavean .................................... | 370/335 |
| 5,983,113 | 11/1999 | Asanuma ................................ | 455/506 |

*Primary Examiner*—Chi H. Pham
*Assistant Examiner*—Brenda H. Pham
*Attorney, Agent, or Firm*—David Newman; Chartered

[57] ABSTRACT

A system for maintaining orthogonality among a plurality of spread-spectrum signals arriving at a base station from a plurality of remote units. Each spread-spectrum signal of the plurality of spread-spectrum signals from each remote unit of the plurality of remote units is transmitted as a packet having a header followed by data. A base station sends a plurality of adjustment signals over a communications channel to the plurality of remote units, respectively. At each remote unit, a circuit selects, from the plurality of adjustment signals, a received-adjustment signal designated for each remote unit. A chip-sequence generator, located at each remote unit, generates a chip-sequence signal assigned to a respective remote unit and, responsive to the adjustment signal, adjusts timing of a chip-sequence signal generated by the chip-sequence generator. A remote spread-spectrum spreader processes, using the chip-sequence signal generated by the chip-sequence generator, a header-symbol signal and a data-sequence signal as an RU-spread-spectrum signal. An RU-transmitter section, time synchronized responsive to the adjustment signal, sends the RU-spread-spectrum signal over the communications channel to the base station. A base-station despreader despreads the RU-spread-spectrum signal as a header and data. A comparator compares the header with a timing signal to generate the adjustment signal.

7 Claims, 4 Drawing Sheets

ORTHOGONAL SPREAD SPECTRUM SYSTEM

BACKGROUND OF THE INVENTION

This invention relates to spread-spectrum communications, and more particularly to reducing interference between multiple spread-spectrum signals arriving at a base station from multiple remote units.

DESCRIPTION OF THE RELEVANT ART

In a spread spectrum system, one method for increasing capacity is to abate the interference caused by multiple users by designing a circuit to ensure all spread-spectrum signals received are orthogonal to each other. When transmitting the spread-spectrum signals from the base station, since they are all sent simultaneously, one merely has to use spreading chip-sequence signals that are orthogonal. This way, except for the multipath, the remote units are able to despread the wanted spread-spectrum signal with no interference from spread-spectrum signals destined for the other remote units. Even the multipath rays, although not orthogonal to the main ray, present to the Rake portion of the receiver a desired spread-spectrum signal with all other spread-spectrum signals orthogonal on that ray.

Since the remote units, however, are located at unpredictable distances from the base station, when the spread-spectrum signals are received from the remote units at the base station, the spread-spectrum signals are not aligned in time and therefore are not orthogonal. The capacity, that is the number of simultaneous users, is limited accordingly.

SUMMARY OF THE INVENTION

A general object of the invention is reduced or no interference at a base station, from a plurality of spread-spectrum signals arriving at the base station from a plurality of remote units.

Another object of the invention is to maintain orthogonality between a plurality of chip-sequence signals embedded in a plurality of spread-spectrum signals arriving from a plurality of remote units, at a base station.

The present invention broadly includes a method for maintaining orthogonality among a plurality of remote unit (RU) spread-spectrum signals arriving at a base station from a plurality of remote units. Each RU-spread-spectrum signal from each remote unit is transmitted as a packet having a header followed in time by data. A RU-spread-spectrum signal, as used herein, is a spread-spectrum signal arriving at the input of the spread-spectrum receiver located at the base station.

The RU-spread-spectrum signal is assumed to include a plurality of packets. The header and data are sent as a packet, and the timing for the data in the packet is keyed from the header. The data may contain information such as digitized voice, video, and other data, along with signaling, adaptive power control (APC), cyclic-redundancy-check (CRC) code, etc.

The header, or preamble, is generated from spread-spectrum processing a header-symbol-sequence signal with a chip-sequence signal. The data part of the packet is generated from spread-spectrum processing a data-symbol-sequence signal with the chip-sequence signal. The chip-sequence signal for spread-spectrum processing the header-symbol-sequence signal and the data-symbol-sequence signal do not have to be the same.

The method includes the steps of generating, at the base station, a timing signal and generating, for each remote unit, an adjustment signal. The steps include multiplexing, for each remote unit, data and an adjustment signal designated for each remote unit of the plurality of remote units. A multiplexed signal is thereby generated. The step of multiplexing thereby generates a plurality of multiplexed signals for the plurality of remote units, respectively.

The steps include spread-spectrum processing the plurality of multiplexed signals with a plurality of chip-sequence signals. A particular chip-sequence signal is assigned to a particular remote unit. Each of the plurality of chip-sequence signals for each of the plurality of remote units is different. The step of spread-spectrum processing thereby generates a plurality of spread-spectrum-processed signals. The steps include combining the plurality of spread-spectrum-processed signals as a code-division-multiplexed (CDM) signal and transmitting the CDM signal over a communications channel to the plurality of remote units.

At each remote unit, the steps include despreading, using a chip-sequence signal assigned to that particular remote unit, a particular spread-spectrum channel designated for the particular remote unit, from the CDM signal, as a received-multiplexed signal designated for the particular remote unit. The received-multiplexed signal is demultiplexed as an adjustment signal and data. The steps include, at the remote unit, adjusting the timing of the chip-sequence generator and the timing of transmitting from the particular remote unit.

At the remote unit (RU), the steps include spread-spectrum processing, using a chip-sequence signal generated by the chip-sequence generator and time synchronized in response to the adjustment signal, a header-symbol sequence signal and a data-sequence signal as an RU-spread-spectrum signal. The steps include transmitting, time synchronized in response to the adjustment signal, the RU-spread-spectrum signal over the communications channel to the base station.

At the base station, the steps further include despreading the RU-spread-spectrum signal as a header and as the data-sequence signal and comparing the despread header to the timing signal to generate the adjustment signal.

The present invention also includes a system for maintaining orthogonality among a plurality of RU-spread-spectrum signals arriving at a base station from a plurality of remote units, respectively. Each RU-spread-spectrum signal from each remote unit is transmitted as a packet, and has a header followed by data. At the base station the system comprises multiplexer means, a base transmitter, a base-station despreader and a comparator. At each remote unit the system includes selecting means, a demultiplexer, a chip-sequence generator, remote-spreader means, and an RU-transmitter section.

The multiplexer means multiplexes data and an adjustment signal designated for each remote unit of the plurality of remote units as a multiplexed signal. This thereby generates a plurality of multiplexed signals for the plurality of remote units. The base transmitter sends the plurality of multiplexed signals over the communications channel to the plurality of remote units.

At each remote unit, the selecting means selects from the plurality of multiplexed signals, a received-multiplexed signal designated for the particular remote unit. The demultiplexer demultiplexes an adjustment signal from the received-multiplexed signal. The chip-sequence generator, in response to the adjustment signal, adjusts the timing of a chip-sequence signal, and then generates the chip-sequence signal assigned to the particular remote unit. The remote-spreader means spread-spectrum processes, using the chip-sequence signal generated by the chip-sequence generator, a header-symbol sequence signal and a data-sequence signal. The RU-transmitter section, time synchronized in response to the adjustment signal, sends the RU-spread-spectrum signal over the communications channel to the base station.

At the base station, the base-station despreader despreads the RU-spread-spectrum signal as a header and data. The comparator compares the header with the timing signal to generate the adjustment signal.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Reference now is made in detail to the present preferred embodiments of the invention, examples of which are illustrated in the accompanying drawings.

The present invention provides a novel system and method which can be used as part of a spread-spectrum system, for maintaining orthogonality among a plurality of spread-spectrum signals arriving from a plurality of remote units (RU), respectively. The present invention uses a closed loop, continuously adjusted, automatic time control that adjusts the transmit clock of the remote unit transmitter so that all the remote signals received at the base station arrive orthogonal to each other. The control mechanism needs to be continuously adjusted or periodically adjusted, with a sufficiently short period since it is assumed that the remote units are in motion.

Figure 1:
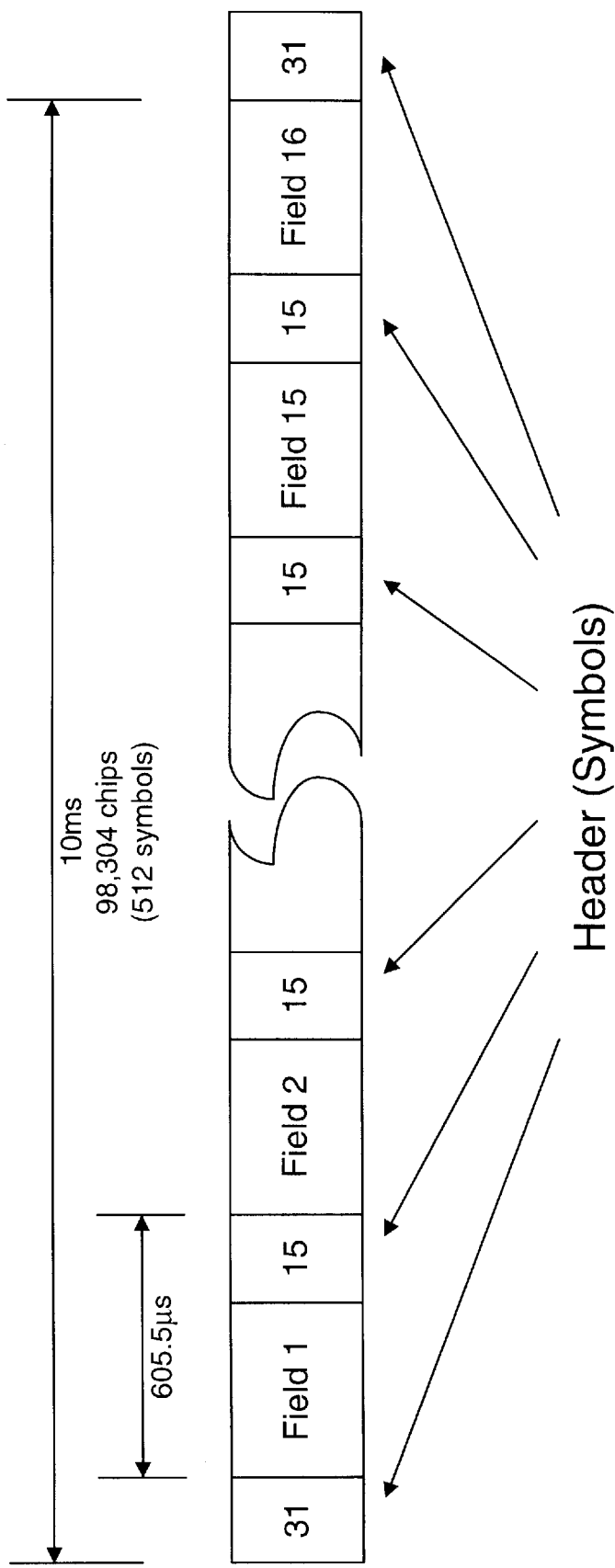
FIG. 1 illustrates a spread-spectrum signal having periodic headers interspersed with fields of data symbols.

The received remote unit (RU) spread-spectrum signal, at a base station, is assumed to include a plurality of packets. Each packet has a header followed in time by data. As shown in FIG. 1, the spread spectrum signal may be formed by using periodic headers interspersed with fields of data. Each header is generated from spread-spectrum processing a header-symbol-sequence signal with a chip-sequence signal using techniques well known in the art.

The header-symbol-sequence signal is a predefined sequence of symbols. Each symbol is formed by N chips, where N is sometimes referred to the processing gain (PG). The header-symbol-sequence signal may be a pseudo random sequence, a constant value, i.e., just a series of 1-bits or symbols, or a series of 0-bits or symbols, or alternating 1-bits and 0-bits or alternating symbols, or other predefined sequence as desired. The chip-sequence signal is user-defined and, in a typical practice, is used with a header-symbol-sequence signal.

The data part of the RU-spread-spectrum packet is generated similarly, from techniques well known in the art as used for the header, by spread-spectrum processing a data-symbol-sequence signal with the chip-sequence signal. The data-symbol-sequence signal may be derived from data, or from an analog signal converted to data, signaling information, or other source of data symbols or bits. The chip-sequence signal can be user-defined, and preferably is orthogonal or nearly orthogonal to other spread-spectrum channels using the chip-sequence signal, as is well known in the art. The data sequence can be forward error coded (FEC) to improve its error rate performance.

Figure 2:
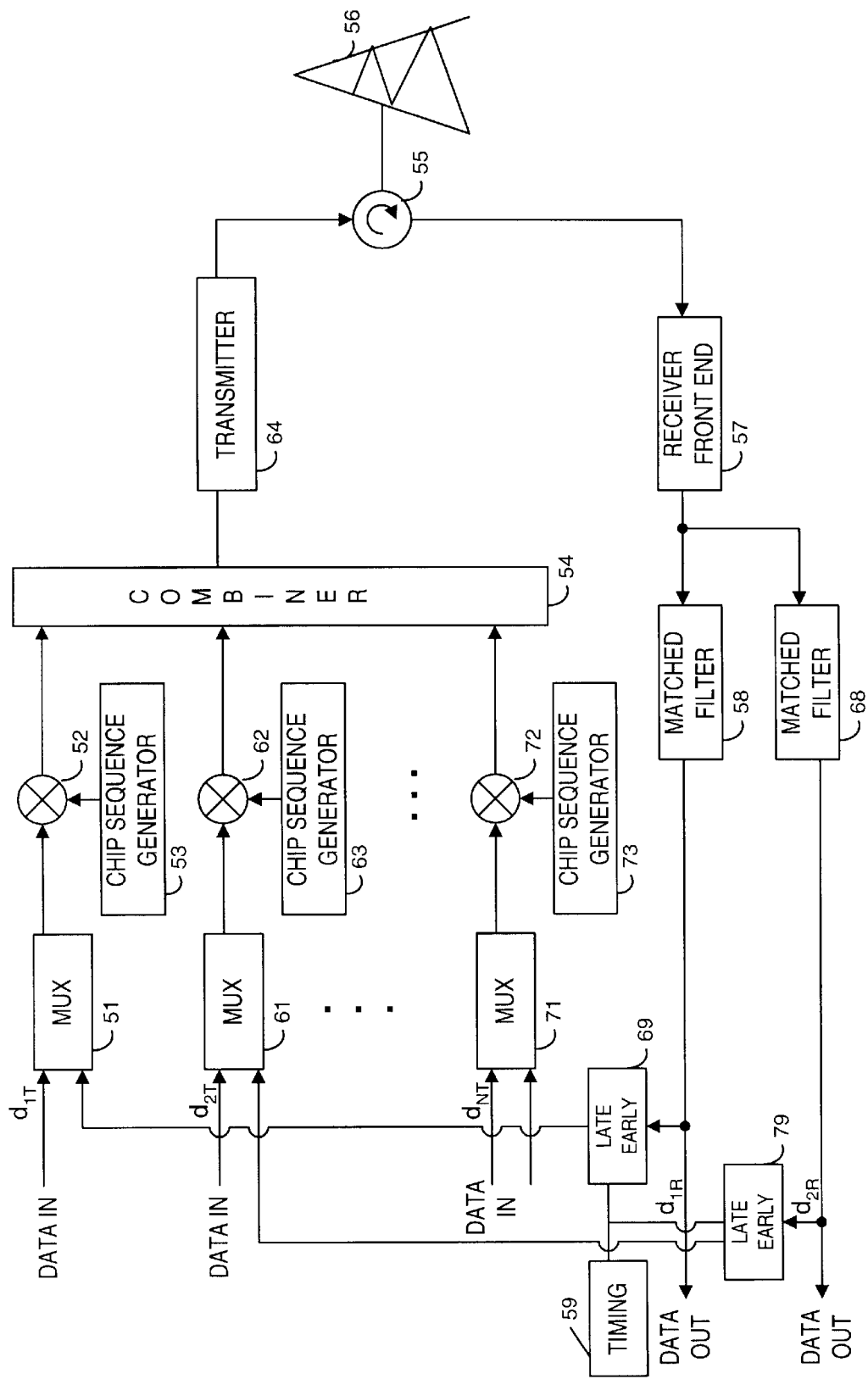
FIG. 2 is a block diagram of a base station.

In the exemplary arrangement shown in FIG. 2, a block diagram of a base station for maintaining orthogonality among a plurality of RU-spread-spectrum signals arriving at a base station from a plurality of remote units is shown. Each RU-spread-spectrum signal of the plurality of RU-spread-spectrum signals from each remote unit of the plurality of remote units, respectively, is transmitted as a packet having the header followed in time by data. The system comprises multiplexer means, spreader means, a combiner, a transmitter section, a circulator, an antenna, a receiver front end, despreader means, a late-early circuit, and a timing circuit.

The multiplexer means may be embodied as a plurality of multiplexers 51, 61, 71 and the spread-spectrum means may be embodied as a plurality of product devices 52, 62, 72, connected between the plurality of multiplexers 51, 61, 71, and a plurality of chip-sequence generators 53, 63, 73, respectively. The output of each of the product devices 52, 62, 72 is coupled to a combiner 54. A transmitter section 64 is coupled between the combiner 54 and the circulator 55. The circulator is coupled to the antenna 56 and to the receiver front end 57. The despreader means may be embodied as a plurality of matched filters 58, 68, with each matched filter, as illustrated by way of example for the first matched filter 58 and the second matched filter 68, coupled to a first late-early circuit 69 and a second late-early circuit 79, respectively. The first late-early circuit 69 and the second late-early circuit 79 are also coupled to a timing circuit 59. The output of the late-early circuits 69, 79 is coupled to the multiplexer means which, as shown in FIG. 2, is embodied as the plurality of multiplexers 51, 61, 71.

The plurality of multiplexers 51, 61, 71 multiplex, for each remote unit, data and an adjustment signal designated for each remote unit of the plurality of remote units, thereby generating a plurality of multiplexed signals for the plurality of remote units, respectively. Accordingly, a first adjustment signal for the first remote unit is outputted from the first late-early circuit 69 to a respective multiplexer 51 of the plurality of multiplexers 51, 61, 71, and a second adjustment signal for the second remote unit is outputted from the second late-early circuit 79 to a respective multiplexer 61 of the plurality of multiplexers 51, 61, 71.

Data, as first data-in, $d_{1T}$, for the first remote unit are inputted to the first multiplexer 51 of the plurality of multiplexers 51, 61, 71; data, as second data-in, $d_{2T}$, for the second remote unit are inputted to the second multiplexer 61; and data, as $N^{th}$, data-in, $D_{2T}$, are inputted to the $N^{th}$ multiplexer 71. The first multiplexed signal comprises the first data-in, $d_{1T}$, multiplexed by the first multiplexer 51 with the first adjustment signal. The second multiplexed signal comprises the second data-in, $d_{2T}$, multiplexed by the second multiplexer 61 with the second adjustment signal. The $N^{th}$ multiplexed signal comprises the $N^{th}$ data-in, $d_{NT}$, multiplexed by the $N^{th}$ multiplexer 71 with the $N^{th}$ adjustment signal. The respective data are multiplexed with a respective adjustment signal to generate a respective multiplexed signal. Each respective multiplexed signal is spread-spectrum processed by the spread-spectrum processing means.

In the example shown in FIG. 2, the spread-spectrum processing means includes a first chip-sequence generator 53 which generates a first chip-sequence signal. The first chip-sequence signal is multiplied by a first multiplexed signal by product device 52. The first multiplexed signal is spread-spectrum processed by the first product device 52 using a chip-sequence signal from the first chip-sequence generator 53. The second multiplexed signal is spread-spectrum processed by the second product device 53 using a second chip-sequence signal generated by the second chip-sequence generator 63. The $N^{th}$ multiplexed signal is spread-spectrum processed by the $N^{th}$ product device 72 using an $N^{th}$ chip-sequence signal generated by the $N^{th}$ chip-sequence generator 73. The first product device 52 thereby generates a first spread-spectrum signal, the second product device 62 thereby generates a second spread-spectrum signal, and the $N^{th}$ product device 72 thereby generates an $N^{th}$ spread-spectrum signal.

The combiner 54 combines, algebraically, the first spread-spectrum signal, the second spread-spectrum signal, and additionally generated spread-spectrum signals through the $N^{th}$ spread-spectrum signal, to generate a code division multiplexed (CDM) signal. The CDM signal is shifted to the carrier frequency, amplified and transmitted over the communications channel by the transmitter section 64, passed through a circulator 55 and radiated by antenna 56.

Figure 3:
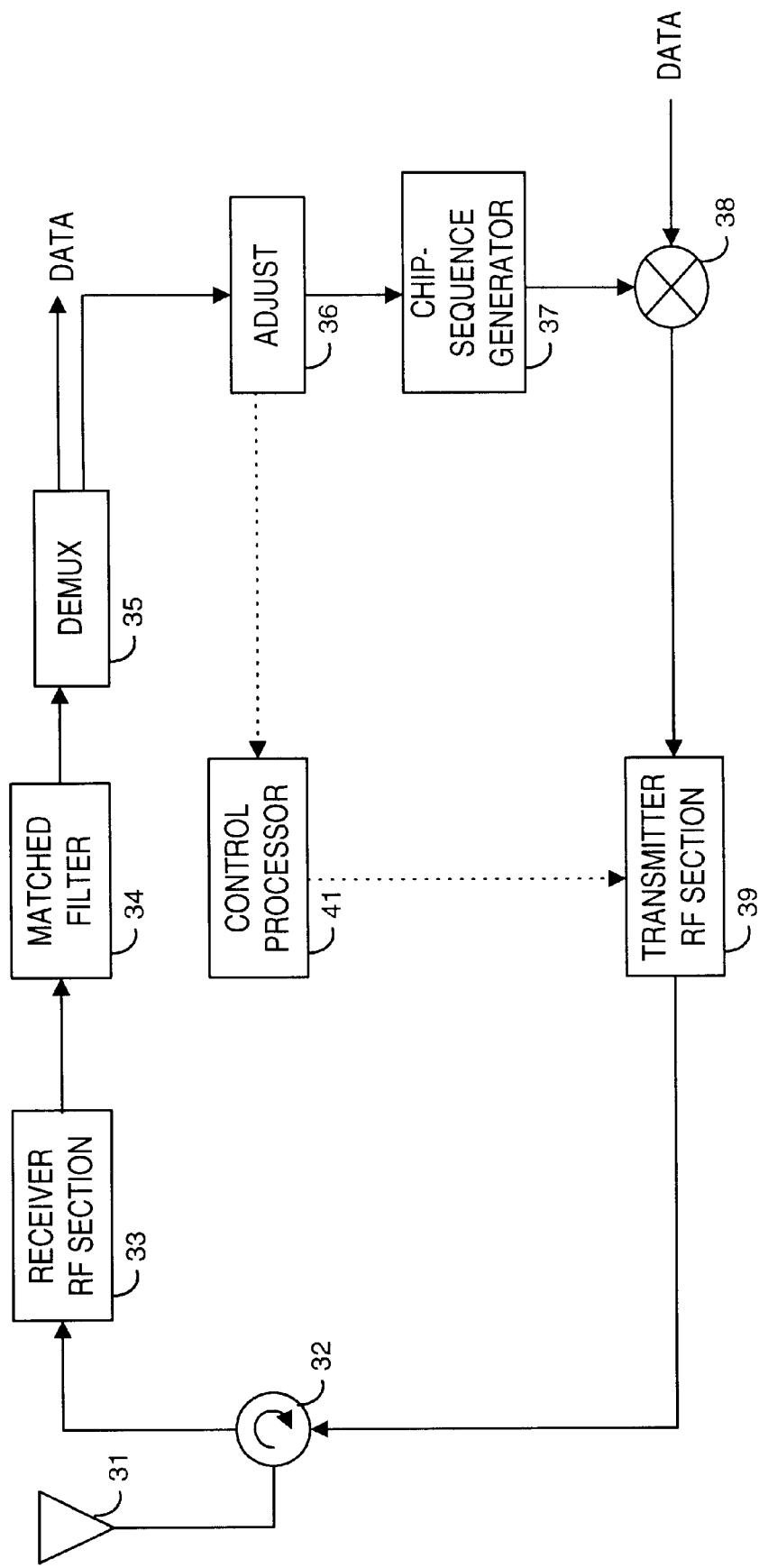
FIG. 3 is a block diagram of a remote unit.

Referring to FIG. 3, each remote unit includes an antenna 31 coupled to a circulator 32, a receiver RF section 33, a matched filter 34, a demultiplexer 35, an adjustment circuit 36, a chip-sequence generator 37, a product device 38, a transmitter RF section 39 and a control processor 44. The antenna 31 is coupled to the circulator 32 and the circulator 32 is coupled to the receiver RF section 33 and the transmitter RF section 39. The matched filter 34 is coupled between the receiver RF section 33 and the demultiplexer 35. The adjustment circuit 36 is coupled between the demultiplexer 35 and the chip-sequence generator 37. A control processor 41 is coupled to the adjustment circuit 36 and to the transmitter RF section 39. The chip-sequence generator 37 is coupled to the product device 38 which is coupled to the transmitter RF section 39 and to a data input.

The received CDM signal from the base station passes through the antenna 31 and through the circulator 32 to the receiver RF section 33. The receiver RF section 33 shifts the received CDM signal to a processing frequency, as well as amplifies and filters the received CDM signal. The matched filter 34 despreads the particular multiplexed signal, or spread-spectrum signal, embedded in the CDM signal, designated for that remote unit. This despreading essentially selects from the plurality of multiplexed signals, a received-multiplexed signal designated for that particular remote unit. The matched filter 34 may equivalently be embodied as a correlator, as is well known in the art.

The demultiplexer 35 demultiplexes the data and the adjustment signal from the received-multiplexed signal. The adjustment signal passes to the adjustment circuit 36. In response to the adjustment signal, the adjustment circuit 36, through the control processor 41, shortens or lengthens the timing for when a packet signal is sent from the transmitter RF section 39. The adjustment section 36 additionally may control the timing of the chip-sequence generator 37 to adjust the timing of the chip-sequence signal. The timing of the chip-sequence signal includes sliding the chip sequence in time, with respect to a reference.

The remote unit may include circuitry which includes a product device 38 for spread-spectrum processing a header-symbol signal and a data-symbol signal with an RU-chip-sequence signal generated by the chip-sequence generator 37, to generate an RU-spread-spectrum signal. The RU-spread-spectrum signal is sent over the communications channel to the base unit. The RU-transmitter section 39, which is timed sequenced to the adjustment signal, sends the RU-spread-spectrum signal over the communication channel to the base station.

At the base station, as illustrated in FIG. 2, the received RU-spread-spectrum signal from each remote unit passes through the antenna 56, through the circulator 55, to the receiver-front end 57. For each received RU-spread-spectrum signal, a matched filter 58, 68, having an impulse matched to a respective received RU-spread-spectrum signal, despreads the respective RU-spread-spectrum signal as header and data, respectively. Preferably, the matched filter performs correlations at twice the chip rate. For each despread RU-spread-spectrum signal, a comparator in the respective late-early circuit 69, 79 compares the header with a timing signal. The comparator generates the adjustment signal. Typically the comparator is located within the respective late-early circuit 69, 79 and the timing signal comes from the timing circuit 59. For the first remote unit, by way of example, the first adjustment signal passes from the first late-early circuit 69 to the first multiplexer 51 which multiplexes the first data-sequence signal and the first adjustment signal for the first remote unit and, after being spread-spectrum processed and combined with other channels as part of a CDM signal, is transmitted over the communications channel.

The present invention also includes a method for maintaining orthogonality among a plurality of spread-spectrum signals arriving at a base station from a plurality of remote units.

The method includes the steps of generating, at the base station, a timing signal and generating, at the base station, for each remote unit (RU) of the plurality of remote units, an adjustment signal. The steps include multiplexing, for each remote unit of the plurality of remote units, data and an adjustment signal designated for each remote unit of the plurality of remote units, as a multiplexed signal. This thereby generates a plurality of multiplexed signals for the plurality of remote units, respectively. The steps further include spread-spectrum processing the plurality of multiplexed signals with a plurality of chip-sequence signals, which are assigned to the plurality of remote units, respectively. This thereby generates a plurality of spread-spectrum processed signals. The steps also include combining the plurality of spread-spectrum signal as a code division multiplexed (CDM) signal and transmitting the CDM signal over a communications channel to the plurality of remote units.

At a particular remote unit, the steps include despreading, using a chip-sequence signal assigned to the particular remote unit, a particular spread-spectrum signal, designated for the particular remote unit, from the CDM signal as a received-multiplexed signal. The steps further include demultiplexing the adjustment signal from the received-multiplexed signal, and adjusting timing of a chip-sequence generator and timing of transmitting from the particular remote unit. The steps also include spread-spectrum processing, using a chip-sequence signal generated by the chip-sequence generator and time synchronized responsive to the adjustment signal, a header-symbol sequence and a data-sequence signal as an RU-spread-spectrum signal.

Further, the steps include transmitting, time synchronized responsive to the adjustment signal, the RU-spread-spectrum signal over the communications channel to the base station.

At the base station the steps further include despreading the received RU-spread-spectrum signal as a header and the data-sequence signal. The steps also include, for each received RU-spread-spectrum signal, comparing the despread header to the timing signal to generate the adjustment signal. The adjustment signal is then multiplexed with data designated for that particular remote unit, spread-spectrum processed, and sent over the communications channel.

Figure 4:
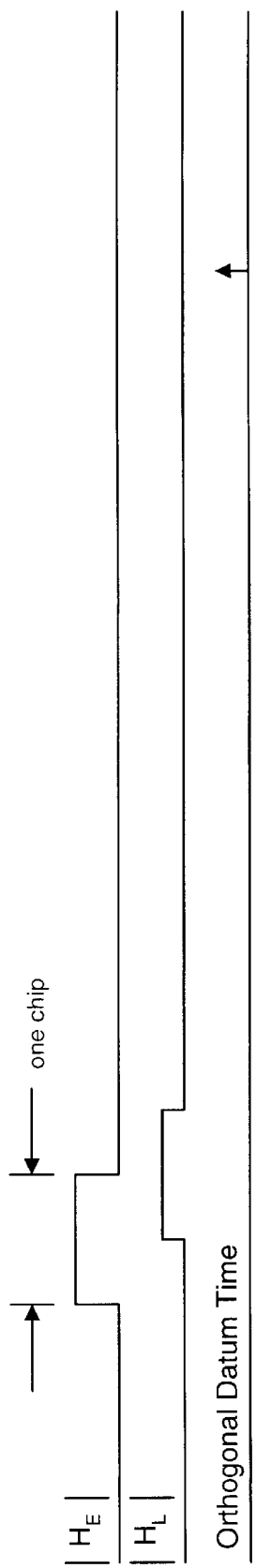
FIG. 4 illustrates an output of a matched filter.

To explain the control process, assume a single ray is received at the base station. The output of the matched filters whose coefficients are set to the header sequence is shown in FIG. 4. A header that is detected early is denoted an early-header signal $|H_E|$, and a header that is detected late is denoted a late-header signal $|H_L|$.

In the example of FIG. 4, the early-header signal $|H_E|$ is the largest header-correlated value of the two, and since its position occurs before the datum set by the base, a signal sent to the remote unit would indicate to slow the remote chip clock. Note that the magnitude is used for both late-header signal $H_L$ and the early-header signal $H_E$, where the magnitude of a header $|H|=|H_I|\cdot H_Q$, the dot product of the in-phase component $H_I$ and quadrature-phase component $H_Q$ of the header. This way the frequency offset or Doppler component is removed.

Figure 5:
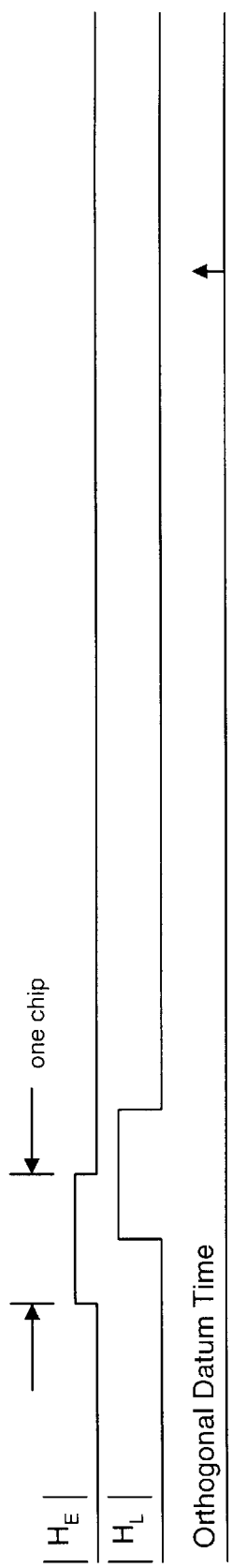
FIG. 5 illustrates an output of a matched filter.

Some time later, depending upon the time constant of the control processor, the same ray would appear at the base as shown in FIG. 5.

Figure 6:
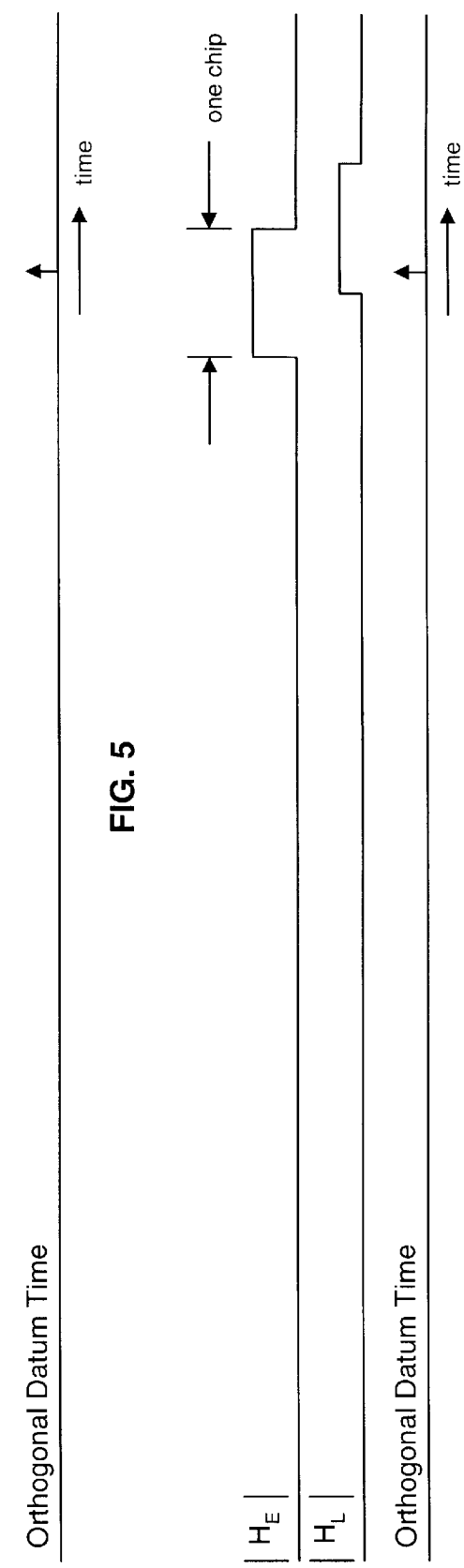
FIG. 6 illustrates an output of a matched filter with the remote unit chip clock slowed.

Now, the late-header signal $|H_L|$ is the largest correlated value. Therefore, a signal is sent to the remote unit to speed up the chip clock. During this process of slowing or speeding up the chip clock, the detection of the data symbols is not affected since the double sampling of each chip, when combined, continues to produce valid outputs from the matched filter. Eventually, the remote chip clock is adjusted so that the header correlations appear as shown in FIG. 6.

In the steady state, the early-header signal $|H_E|$ and the late-header signal $|H_L|$ alternate as to which one is the largest and these signals slow and speed up the remote chip clock accordingly. In FIG. 6, the remote frame is aligned to the base time datum. Since this process is applied to all active users, the signals arriving at the base are aligned in time. If the remote units used orthogonal chip-sequence signals to spread the data symbols, then the chip-sequence signals embedded in the received spread-spectrum signals are orthogonal.

Assume initially that a remote unit transmits its signal immediately after receiving a particular spread-spectrum signal from the base station. If the transmitting remote unit is six kilometers from the base station, and another remote unit is very close to the base, then the time difference of arrival might be 40 microseconds ($\mu$sec). Therefore the automatic time control adjusts the closer remote unit to slow its chip clock so that its transmitted spread-spectrum signal arrives at the base 40 $\mu$sec later.

Although many closed loop methods can be deployed, one method that is easily understandable is the use of delta modulation. If the chip rate were 10 MHz and the time were corrected at a constant rate of 0.1 chip/frame (10 msec), which is 10 times the speed of the time Doppler due to motion of a vehicle at 100 ft/sec, then it takes as long as 40 seconds to correct the closer remote unit's chip clock. This suggests that instead of employing a linear delta modulator, an adaptive one should be used. Alternatively, more frequent updates to the time correction can be made, such as a correction every field or every 605.5 $\mu$sec. This would result in an orthogonal position "lock" after 2.4 seconds using linear delta modulation and less for adaptive delta modulation. ADPCM, or PCM, dependent on the duration of the packet. In any case, there appears to be sufficient degrees of freedom to acquire and maintain time lock to whatever reasonable accuracy and speed is desired.

One other note on this invention is the constructive impact on a different part of the receiver, namely the carrier frequency of the remote unit transmitter and the down converter accuracy. For the received signals to be truly orthogonal, the relative Doppler offsets should be zero. If the RF synthesizer is locked to the same reference oscillator as the chip clock, then by adjusting the chip clock through the automatic time control mechanism described above, the carrier frequency also is adjusted. Therefore, the received frequency offset along with the transmitted carrier frequency offset is driven towards zero.

It will be apparent to those skilled in the art that various modifications can be made to the orthogonal spread spectrum system of the instant invention without departing from the scope or spirit of the invention, and it is intended that the present invention cover modifications and variations of the orthogonal spread spectrum system provided they come within the scope of the appended claims and their equivalents.

We claim:

1. A method for maintaining orthogonality among a plurality of spread-spectrum signals arriving at a base station from a plurality of remote units, respectively, with each spread-spectrum signal, of the plurality of spread-spectrum signals, from each remote unit, of the plurality of remote units, transmitted as a packet having a header followed in time by data, the method comprising the steps of:

generating, at said base station, a timing signal;

generating, at said base station, for each remote unit (RU) of said plurality of remote units, an adjustment signal;

multiplexing, at said base station, for each remote unit of said plurality of remote units, data and an adjustment signal designated for a particular remote unit as a multiplexed signal, thereby generating a plurality of multiplexed signals for the plurality of remote units, respectively;

spread-spectrum processing, at said base station, the plurality of multiplexed signals with a respective plurality of chip-sequence signals assigned to the plurality of remote units, respectively, thereby generating a plurality of spread-spectrum processed signals;

combining the plurality of spread-spectrum processed signals as a code division multiplexed (CDM) signal;

transmitting the CDM signal over a communications channel to the plurality of remote units;

despreading, at a particular remote unit, using a chip-sequence signal assigned to the particular remote unit, a particular spread-spectrum channel designated for the particular remote unit from the CDM signal as a received-multiplexed signal designated for the particular remote unit;

demultiplexing, at the particular remote unit, the adjustment signal from the received-multiplexed signal;

adjusting, at the particular remote unit, timing of a chip-sequence generator and timing of transmitting from the particular remote unit;

spread-spectrum processing, at the particular remote unit, using a chip-sequence signal generated by the chip-sequence generator and time synchronized responsive to the adjustment signal, a header-symbol sequence and a data-sequence signal as an RU-spread-spectrum signal;

transmitting, time synchronized responsive to the adjustment signal, the RU-spread-spectrum signal over the communications channel to the base station;

despreading, at the base station, the RU-spread-spectrum signal as a header and the data-sequence signal; and comparing the despread header to the timing signal to generate the adjustment signal.

2. The method as set forth in claim 1 further including the steps of:

generating, at the base station, the adjustment signal indicating an early header; and lengthening, at the particular remote unit, the timing for transmitting the RU-spread-spectrum signal.

3. The method as set forth in claim 1, further including the steps of:

generating, at the base station, the adjustment signal indicating a late header; and shortening, at the particular remote unit, the timing for transmitting the RU-spread-spectrum signal.

4. A method for maintaining orthogonality among a plurality of spread-spectrum signals arriving at a base station from a plurality of remote units, respectively, with each spread-spectrum signal from each remote unit transmitted as a packet having a header followed in time by data, the method comprising the steps of:

generating, at said base station, a timing signal;

generating, at said base station, for each remote unit (RU) of said plurality of remote units, an adjustment signal;

transmitting the adjustment signal, for each remote unit of said plurality of remote units, over a communications channel to the plurality of remote units;

receiving, at each remote unit, the adjustment signal for the respective remote unit;

adjusting, at each remote unit, timing of a chip-sequence generator and timing of transmitting from the particular remote unit;

spread-spectrum processing, at each remote unit, using a respective chip-sequence signal generated by the chip-sequence generator of each respective remote unit and time synchronized responsive to the adjustment signal, a header-symbol sequence and a data-sequence signal as an RU-spread-spectrum signal;

transmitting, time synchronized responsive to the adjustment signal, the RU-spread-spectrum signal over the communications channel to the base station;

despreading, at the base station, the RU-spread-spectrum signal as a header and the data-sequence signal; and comparing the header to the timing signal to generate the adjustment signal.

5. The method as set forth in claim 4 further including the steps of:

generating, at the base station, the adjustment signal indicating an early header; and lengthening, at the particular remote unit, the timing for transmitting the RU-spread-spectrum signal.

6. The method as set forth in claim 4, further including the steps of:

generating, at the base station, the adjustment signal indicating a late header; and shortening, at the particular remote unit, the timing for transmitting the RU-spread-spectrum signal.

7. A system for maintaining orthogonality among a plurality of spread-spectrum signals arriving at a base station from a plurality of remote units, respectively, with each spread-spectrum signal of the plurality of spread-spectrum signals from each remote unit of the plurality of remote units transmitted as a packet having a header followed by data, the system comprising:

multiplexer means, located at said base station, for multiplexing as a multiplexed signal, for each remote unit (RU) of said plurality of remote units, data and an adjustment signal designated for each remote unit of said plurality of remote units, thereby generating a plurality of multiplexed signals for the plurality of remote units, respectively;

a base transmitter, located at said base station, for sending the plurality of multiplexed signals over a communications channel to the plurality of remote units;

means, located at each remote unit, for selecting from the plurality of multiplexed signals, a received-multiplexed signal designated for each remote unit;

a demultiplexer, located at each remote unit of said plurality of remote units, for demultiplexing the adjustment signal from the received-multiplexed signal;

a chip-sequence generator, located at each remote unit, for generating a chip-sequence signal assigned to a respective remote unit and, responsive to the adjustment signal, for adjusting timing of a chip-sequence signal generated by said chip-sequence generator;

remote-spreader means, located at each remote unit, for spread-spectrum processing, using the chip-sequence signal generated by the chip-sequence generator, a header-symbol signal and a data-sequence signal as an RU-spread-spectrum signal;

an RU-transmitter section, located at each remote unit, time synchronized responsive to the adjustment signal for sending the RU-spread-spectrum signal over the communications channel to the base station;

a base-station despreader, located at said base station, for despreading the RU-spread-spectrum signal as a header and data; and a comparator, located at said base station, for comparing the header with a timing signal, to generate the adjustment signal.

* * * * *